2,327,498

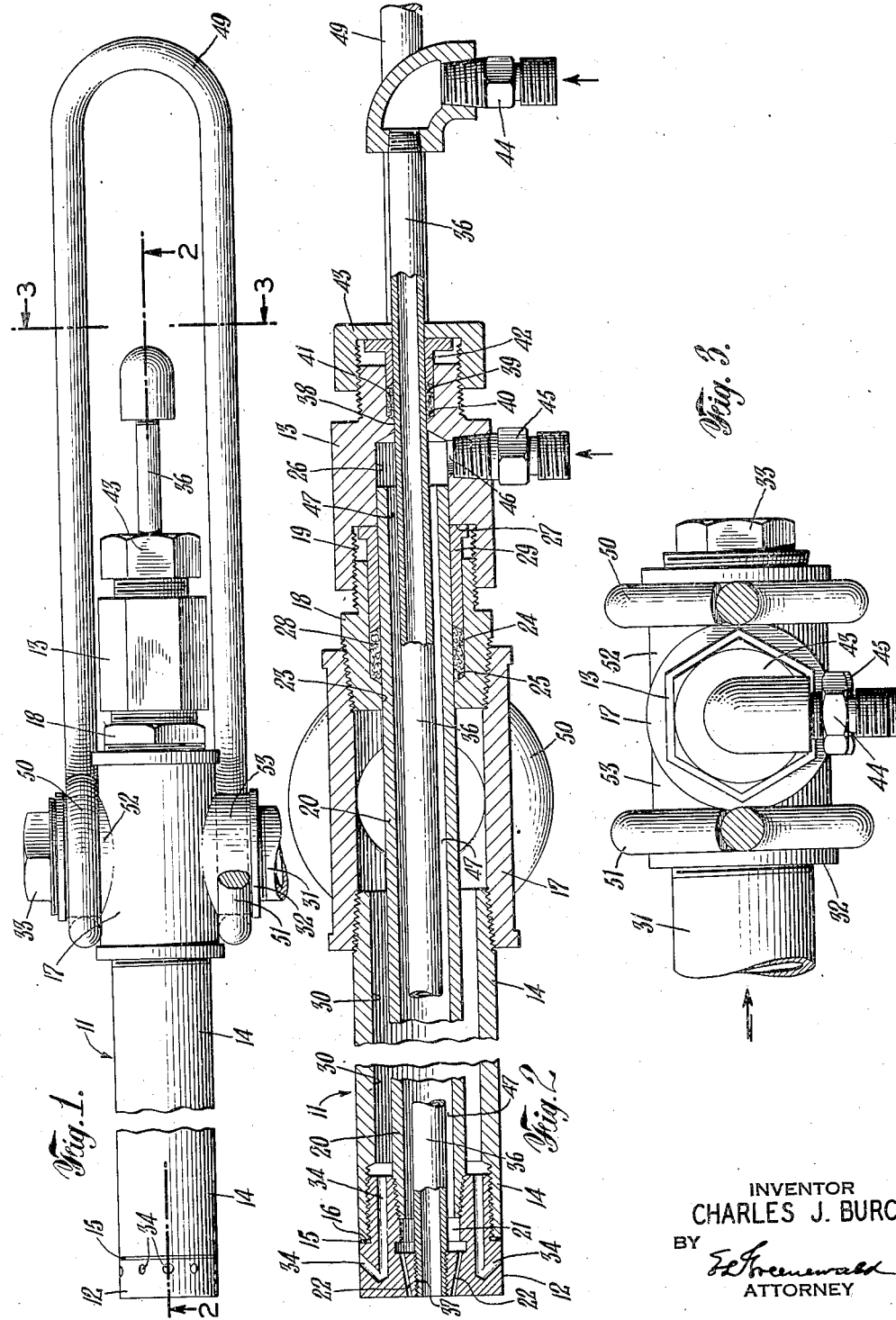
Aug. 24, 1943.     C. J. BURCH     2,327,498
BLOWTORCH
Filed April 18, 1941     2 Sheets-Sheet 1
INVENTOR
CHARLES J. BURCH
BY
ATTORNEY Aug. 24, 1943.   C. J. BURCH   2,327,498
BLOWTORCH
Filed April 18, 1941   2 Sheets-Sheet 2
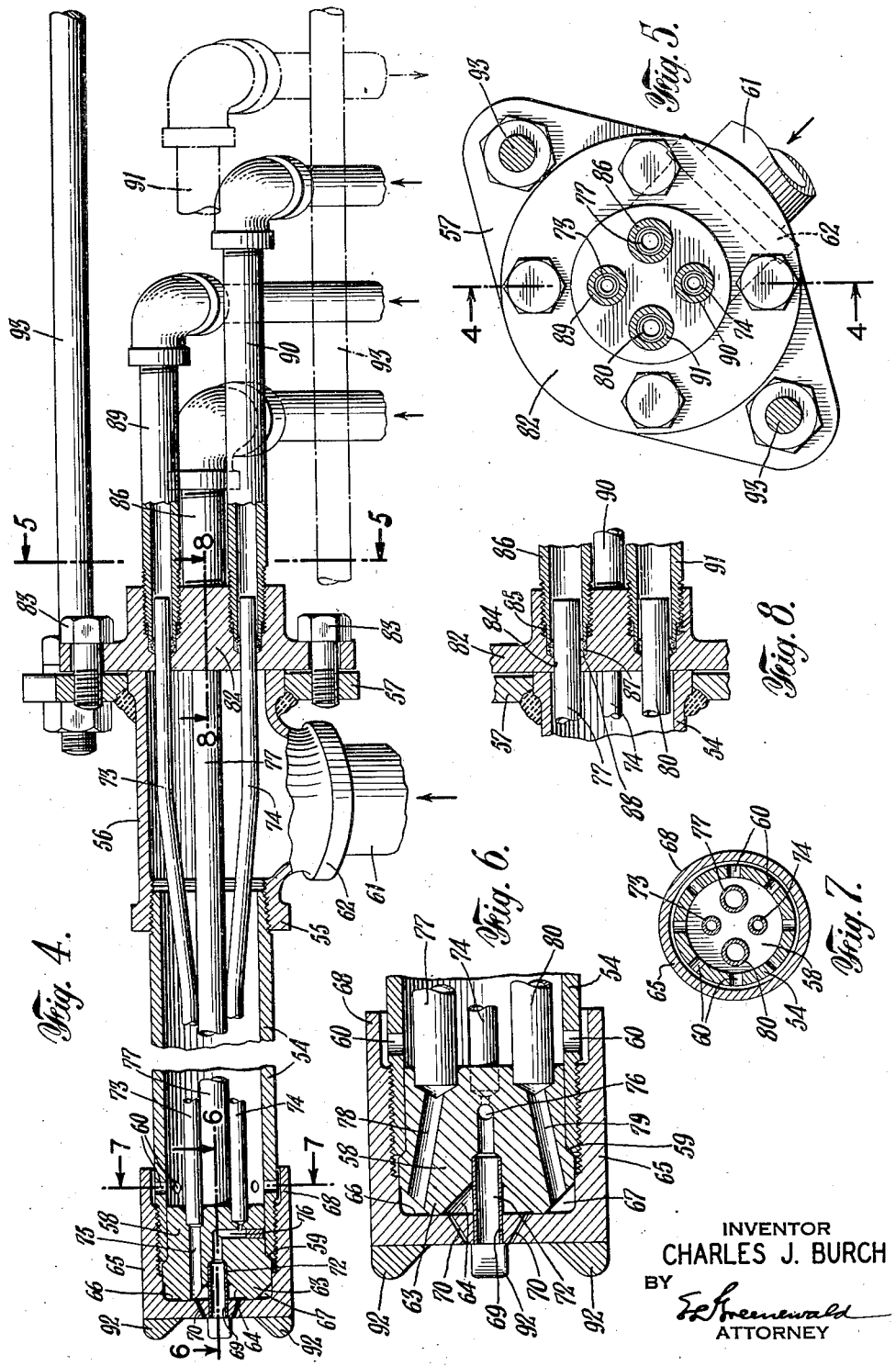
INVENTOR
CHARLES J. BURCH
BY
ATTORNEY Patented Aug. 24, 1943

UNITED STATES PATENT OFFICE 2,327,498

BLOWTORCH

Charles J. Burch, Kenmore, N. Y., assignor to The Linde Air Products Company, a corporation of Ohio Application April 18, 1941, Serial No. 389,115

12 Claims. (Cl. 255—1.8)

This invention relates to heating instrumentalities, such as blowtorches, which are particularly useful for piercing deep blasting holes and the like in minerals and mineral-like materials.

The blowtorches described herein are similar in some respects to the blowtorches described and claimed in Patent 2,286,191, issued June 16, 1942, to Robert B. Aitchison, Charles J. Burch, and Charles W. Swartout, and Patent 2,286,192, issued on the same day to Robert B. Aitchison, George H. Smith, and Charles W. Swartout. Moreover, the blowtorches of the present invention are suitable for performing the processes of thermally piercing minerals and like materials described and claimed in the aforementioned patents, as well as the processes described and claimed in application Serial No. 268,634, filed on April 18, 1939, by Robert B. Aitchison, Charles W. Swartout, and Virgil C. Williams. They are especially valuable, however, for piercing holes in minerals of a heat-spallable nature, such as quartzite, ganister, and like materials, wherein the application of heat spalls off particles of rock at the bottom of a hole, the particles then being promptly and continuously removed from the hole.

When thermally piercing holes of great depth in rock, for example twenty feet deep or more, difficulties are encountered which are not usually met in the piercing of holes of much less depth. For example, in blowtorches having two or more elongated tubular members extending from the rear to the front of the blowtorch, the two or more members expand or contract in length by differential amounts in accordance with the varying temperatures to which they are heated within the hole. Because of this, the use of contact seals between the tubular members and other parts, as in prior blowtorches, is prevented. Such differential expansion and contraction, moreover, tends to warp the blowtorch. Another problem is the delivery of the debris-ejection fluid, for example compressed air, at the bottom of a deep hole at an adequate rate of flow to clear from the hole the debris, such as spallings, in a satisfactory manner. Further, it is almost impossible to support and manipulate manually a blowtorch of the required great length and weight during the piercing of generally vertical holes. Still another difficulty is encountered when strata of fusible mineral materials, which may be present in predominantly spallable material, fuse together and plug the hole, thus preventing further advance of the blowtorch. Removal of these plugs by mechanical action with the tip of an ordinary blowtorch usually damages the tip, which thereafter may require complete dismantling of the blowtorch before replacement is possible.

The principal object of the present invention is to provide a blowtorch which will overcome the above-mentioned difficulties encountered during the piercing of deep holes in minerals and the like. More particularly, the objects of the invention are to provide blowtorches in which the differential expansion of multiple tubes will not be detrimental; which will permit the discharge of an ejection fluid, such as compressed air, in an efficient manner and at an adequate rate of flow; which shall have provision for supporting the blowtorch during the piercing of holes in a generally vertical direction; and which shall be designed to permit the replacement of damaged tips without requiring replacement or dismantling of other parts of the blowtorch. Still another object is the provision of such blowtorches which shall be simple, inexpensive, and sturdy in construction, as well as efficient in operation.

The above and other objects, and the novel features of the invention, will become apparent from the following description, having reference to the annexed drawings wherein:

Fig. 1 is an elevational view of one form of blowpipe embodying the invention;

Fig. 2 is a longitudinal sectional view taken along the line 2—2 of Fig. 1;

Fig. 3 is a cross-sectional view taken along the line 3—3 of Fig. 1;

Fig. 4 is a longitudinal sectional view taken along the line 4—4 of Fig. 5, parts being in elevation, showing a modified form of blowtorch;

Fig. 5 is a cross-sectional view taken along the line 5—5 of Fig. 4;

Fig. 6 is an enlarged longitudinal sectional view taken along the line 6—6 of Fig. 4;

Fig. 7 is a cross-sectional view taken along the line 7—7 of Fig. 4; and

Fig. 8 is a longitudinal sectional view taken along the line 8—8 of Fig. 4.

In one form of blowtorch constructed according to the invention, as shown in Figs. 1, 2, and 3, an elongated tubular member 11, for a debris-ejection fluid such as compressed air, is secured at its forward end to a tip 12 and at its opposite end to a rear body 13. The tubular member 11 includes a front tubular section 14, a pipe cross 17, and an adaptor 18. The tubular section 14 is threaded over the tip 12 and compresses a washer 15, of copper or other soft material, against an annular shoulder 16 on the tip to provide a seal. At its rear end, the tubular section 14 is threaded into one side of the pipe cross 17, into the opposite side of which is threaded one end of the tubular externally threaded adaptor 18. The opposite end of the adaptor 18, in turn, is threaded into a cavity 19 in the front of the rear body 13.

An elongated conduit 20, for a combustion-supporting gas such as oxygen, is disposed concentrically within the elongated tubular member 11 with its forward end threaded into a fluid-distributing cavity 21 in the tip 12, from which cavity extend a plurality of annularly arranged fluid passages 22 converging forwardly toward the longitudinal axis of the blowtorch and having openings on the front face of the tip. The conduit 20 passes through a closely fitting bore 23 and a counterbore or packing chamber 24 of relatively large diameter in the adaptor 18, and at its rear end is disposed within a bore 26 in the rear body 13 having a smaller diameter than the cavity 19. Leakage of fluid between the interiors of the tubular member 11 and the conduit 20, and leakage to the atmosphere, are prevented by packing material 28, for example leather, arranged within the packing chamber 24 between the external wall of the conduit 20 and the internal wall of the adaptor 18. The packing 28 is compressed into sealing engagement with the conduit 20 and the adaptor 18 by an annular packing gland 29 which fits snugly between the conduit 20 and the adaptor 18 and abuts against a shoulder 27 in the rear body 13 in fluid-tight engagement therewith. The gland 29 is pulled up tightly against the packing 28 by the adaptor 18, thus also forcing the packing material 28 against a beveled annular shoulder 25 in the adaptor 18 between the bore 23 and the counterbore 24.

An annular passage 30 for a debris-ejection fluid thus is formed between the external surface of the conduit 20 and the internal wall of the elongated tubular member 11. The passage 30 may be supplied with an ejection fluid, such as compressed air, by an inlet conduit 31 threaded into one side 32 of the pipe cross 17, the opposite side of which is closed by a plug 33. At its forward end the annular passage 30 supplies fluid to a plurality of annularly arranged generally V-shaped ports 34 in the tip 12 terminating in openings in the side surface of the tip. Fluid, such as compressed air may be discharged laterally through the ports 34 from the tip 12 adjacent to its front, and in a direction generally toward the rear of the blowtorch at an angle to the blowtorch axis to eject debris, such as spallings, from a hole being pierced.

A tube 36 for a fluid fuel, such as acetylene gas, or acetylene gas in which is suspended a powdered metal or the like, is threaded at its forward end into a central passage 37 in the tip 12. At its rear end the tube 36 passes through a closely fitting passage 38 in the rear body 13, which connects the bore 26 with a cavity or packing chamber 39 in the rear end of the rear body and forms a beveled shoulder 40 at the bottom of the chamber. Packing material 41, of leather or like material, is packed tightly in the cavity 39, between the external wall of the tube 36 and the internal wall of the cavity, by an annular gland 42. The gland 42 fits snugly between the tube 36 and the wall of the cavity 39, and is pulled up tightly against the packing 41 by a gland nut 43 mounted on the tube 36 and threaded over the rear end of the body 13.

In the operation of the blowtorch described above, a fluid fuel, such as gaseous acetylene, or gaseous acetylene within which is suspended a powdered metal or flux-forming material, is admitted to the central tube 36 through an inlet 44, and is discharged in an axial stream from the forward end of the blowpipe. The combustion-supporting gas, such as oxygen, is introduced to the bore 26 through an inlet nipple 45, threaded into a passage 46 in the side of the body 13, and passes forwardly through the annular passage 47, between the tube 36 and the internal wall of the conduit 20, to the distributing chamber 21 in the tip. Oxygen is then discharged through the ducts 22 in a plurality of streams surrounding and converging upon the central fuel stream. The two gases mix outside of the blowpipe and, on ignition, produce an intensely hot flame of the "diffusion" type, which will not flash-back into the blowtorch. Fluid for ejecting spallings and the like from the hole being pierced, such as compressed air, is introduced to the tubular member 11 through the inlet side 32 of the pipe cross 17 and passes forwardly through the annular passage 30 to the tip 12. Then the fluid is discharged from the blow-torch in generally rearwardly directed streams through the ports 34, thus providing for the continuous and uninterrupted ejection of spallings from the hole.

After the hole being pierced has progressed to a depth such that the outer tubular member 11 is so heated that it expands in length a substantial amount, no difficulty is experienced with warping of the blowtorch or leakage of the fluid, because both the intermediate conduit 20 and the central tube 36 are connected to the rear body 13 for straight-line movement relatively thereto, and are packed against fluid leakage. Likewise, when the outer tube 11 is cooled after the piercing operation has been completed, no undue strains are set up in any of the members of the blowpipe because the conduit 20 and the central tube 36 automatically adjust themselves in the rear body 13 to accord with the overall length of the tubular member 11.

When a hole of approximately twenty feet in depth or more must be pierced in a generally vertical direction in rock or the like, manual support and manipulation of the long blow-torch required for the job is very difficult. For this reason, therefore, the blowtorch is provided with a generally U-shaped bail 49 having eyes 50 and 51 swiveled to trunnions 52 and 53, respectively, provided by the two lateral branches of the pipe cross 17. During the piercing of a generally vertical hole, the blowtorch may be suspended in substantially vertical position by a block and tackle, or the like, passing through the swiveled bail 49 and supported at the apex of a tripod or similar support.

In a modified form of blowtorch, as shown in Figs. 4 to 8, inclusive, an elongated tubular fluid-conducting member 54 is threaded at its rear end into one side 55 of the through-passage of a pipe T 56, to the opposite side of which an annular flange 57 is welded. An adaptor body 58 fits frictionally within the front of the tubular member 54 and has an annular beveled shoulder 59 cooperating with an abutment formed by an annular shoulder within the tubular member to limit the extent of the adaptor within the tubular member, and to provide a seal against the escape of debris-ejection fluid.

Just in back of the adaptor 58, the tubular member 54 is provided with a plurality of annularly-arranged radial ports 60 through its side wall for discharging in a lateral direction the debris-ejection fluid, such as compressed air, supplied to the blowtorch through an inlet conduit 61 threaded into the side branch 62 of the pipe T 56. The front face of the adaptor body 58 includes an annular raised boss 63, of generally triangular cross section, having a fairly sharply-defined apex of smaller diameter than the outside diameter of the adaptor body 58 itself, thus providing a conical cavity 64 arranged approximately centrally within the front of the adaptor body. A hollow cylindrical cap 65 is threaded over the outside of the tubular member 54 and the adaptor body 58 with its inner front surface 66 bearing against the apex of the boss 63 to provide an annular seal therebetween, and to wedge the shoulder 59 against the cooperating abutment of the tubular member 54. The cap surface 66 bridges the conical cavity 64, and also forms an annular chamber 67 around the outer corner of the tip, outside the apex of the boss 63, for the circulation of cooling water. The rear end of the cap 65 is provided with a skirt 68 which extends rearwardly beyond the outlets of the ports 60 and is spaced from the external wall of the tubular member 54, thus providing a deflector for deflecting compressed air or the like straight back toward the rear of the blowtorch and the mouth of the hole being pierced, for increased efficiency.

The cap 65 has a central passage 69 and a plurality of forwardly converging ducts 70 surrounding the passage 69 and arranged to discharge streams of combustion-supporting gas toward a central stream of fuel gas discharged from the blowtorch. Both the passage 69 and the passages 70 communicate at their inner ends with the chamber 64. A short nipple 72 is secured within a central bore in the front of the adaptor body 58, as by silver soldering, and fits frictionally within the passage 69 in fluid-tight engagement with the wall of the passage to provide a seal against the leakage of gas from the chamber 64 through the passage 69.

Tubes 73 and 74 for a combustion-supporting gas, such as oxygen, and for a fluid fuel, such as acetylene, or acetylene carrying a powdered combustible metal or the like, respectively, are rigidly secured within bores in the rear end of the adaptor body 58, as by silver soldering. The tubes 73 and 74 communicate, respectively, through passages 75 and 76 in the adaptor body 58 with the cavity 64 and the nipple 72, respectively. Thus, it may be seen that the acetylene is discharged from the blowtorch in a central stream through the nipple 72, and the oxygen is discharged through the ducts 70 in a plurality of small streams surrounding and converging upon the central acetylene stream, with the resultant formation of a combustible gas mixture outside of the blowtorch.

Cooling water for the tip of the blowtorch is supplied through a tube 77 secured within a bore in the rear end of the adaptor body 58, as by silver soldering, and communicating with the annular chamber 67 by way of a passage 78 in the adaptor body; and the cooling water, after circulation through the annular chamber 67, is discharged through a similar passage 79 in the adaptor body 58 to a tube 80, also rigidly secured within a bore in the rear end of the adaptor body.

The tubes 73, 74, 77, and 80 are arranged side-by-side within the outside tubular member 54 and extend rearwardly from the adaptor body 58 to a rear body 82, which is secured to the flange 57 as by the stud bolts 83. All of the last-mentioned tubes are arranged in the rear body 82 for longitudinal movement relatively thereto to compensate for expansion and contraction of the outer tubular member 54, which rigidly connects the tip, comprising the adaptor 58 and the cap 65, to the rear body 82. Inasmuch as the rear end of each of the four tubes is arranged for movement in an identical manner in the rear body 82, only the arrangement of the water inlet tube 77, as shown in Fig. 8, will be described in detail.

As shown in Fig. 8, the tube 77 passes through a small diameter bore 84 in the rear body 82, which opens at its rear end into a counterbore 85. A water supply conduit 86, which is threaded into the counterbore 85 and receives the rear end of the tube 77, has a conically beveled inner end which is drawn up against a mass of packing material 87 in the counterbore 85, for example leather, and forces it tightly against the external surface of the tube 77, the internal surface of the counterbore 85, and an internal annular shoulder 88. A fluid-tight seal thus is formed which will permit the tube 77 to move longitudinally relatively to the rear body 82 when the outside tube 54 expands or contracts. In a similar manner, the tubes 73 and 74 are supplied with oxygen and acetylene, respectively, through the supply conduits 89 and 90, and cooling water is discharged from the blowtorch through the conduit 91.

During the piercing of a blast hole in spallable mineral materials, such as quartzite or ganister, it occasionally happens that the spallable material is interspersed with strata of non-spallable material, such as clay, which fuses and forms a plug under the action of the intense heat of the blowtorch, thereby preventing further advance of the piercing operation. When such a plug forms, it usually may be broken up and removed from the hole by vigorously rotating and agitating the blowtorch so that the forwardly projecting teeth 92, carried on the front of the tip cap 65 at quarter points adjacent to its outer edge, may disintegrate the plug.

A bail 93 also is provided on the blowtorch of Figs. 4 to 8, inclusive, to aid support and manipulation during the piercing of a generally vertical blast hole. In the present modification, however, the bail 93 is rigidly secured to the blowtorch by bolting it to the flange 57. The threaded ends of the generally U-shaped bail 93 pass through the bores in the flange 57 and are bolted securely in place with heavy nuts threaded on the ends of the bail and bearing against opposite sides of the flange.

In the operation of the blowpipe of Figs. 4 to 8, inclusive, the flame is produced in a substantially identical manner with that of the blowpipe of Figs. 1 to 3, inclusive. However, the ejection of spallings from the blast hole is facilitated in this modification by grouping the tubes 73, 74, 77, and 80 side-by-side within the large diameter outside tubular member 54, and by providing relatively large diameter ejection-fluid ports 60, both of which factors combine to permit the discharge of large volumes of compressed air or the like at moderate economically produced pressures. Furthermore, the deflecting skirt 68 provides straight backflow of compressed air and direct ejection of the debris, thus making available substantially all of the kinetic energy of the flowing compressed air or the like for expelling debris from the hole. Moreover, the construction of the tip end of the blowtorch, and the arrangement of the rear ends of the tubes 73, 74, 77, and 80 within the body 82, as well as the provision for bolting the rear body 82 to the flange 57, all cooperate to permit the blowtorch to be dismantled with ease, or to permit any desired part to be removed for repair or replacement.

Instead of compensating for differential expansion and contraction of the tubes in the blowtorches of the invention in the manner particularly described, other means may be employed. For example, an expansible metal bellows may be secured between each tube and the rear body of the blowtorch.

The blowtorch shown in Figs. 4 to 8, inclusive, has features in common with blowtorches described and claimed in application Serial No. 389,116, filed April 18, 1941, by Charles J. Burch.

Although two modifications of blowtorches embodying the principles of the invention have been described specifically, by way of example, it is evident that changes in construction and design may be made without departing from the spirit of the invention as defined in the claims appended hereto.

I claim:

1. In a blowtorch, a front body; a rear body; a first member secured to both of said body members and holding said body members in longitudinally spaced relation to one another; and one or more additional members connecting together said body members, said additional member or members being secured to said front body, and engaging said rear body for longitudinal movement relatively to the latter.

2. In a blowtorch, a front body; a rear body; a tubular fluid-conducting member secured rigidly to both of said bodies; and one or more additional tubular fluid-conducting members arranged within said first-mentioned member, said additional member or members being secured to said front body and engaging said rear body for longitudinal movement relatively to the latter.

3. In a blowtorch, an elongated tubular member adapted to conduct a flowing fluid; a rear body secured to said tubular member; a front body secured to said tubular member; and a plurality of fluid conduits arranged side-by-side within said tubular member, said conduits being rigidly secured to said front body and being engaged with said rear body for longitudinal movement relatively thereto.

4. In a blowtorch, a front body; a rear body having a front bore, a rear bore, and a passage therebetween; a first tubular fluid-conducting member secured to both of said bodies; a second tubular fluid-conducting member within said first member, said second member being secured to said front body and being disposed at its rear end within said front bore for longitudinal movement therein; means providing a seal to prevent the leakage of fluid from said front bore into said first member and from the front of said front bore into the atmosphere; a third tubular fluid-conducting member within said second member, said third member being secured to said front body and extending at its rear end through said passage into said rear bore for longitudinal movement therein; and means providing a seal in said rear bore to prevent the leakage of fluid from said front bore through said passage and said rear bore into the atmosphere.

5. In a blowtorch, a front body; a rear body having a bore; a first tubular fluid-conducting member secured substantially rigidly to both of said bodies; a second tubular fluid-conducting member having a front end secured to said front body and having a rear end extending within said bore in said rear body through one end thereof for longitudinal movement relatively to said body; a fluid-supply conduit extending within said bore through the opposite end thereof and receiving the rear end of said second member; and means cooperating with said second member and said conduit to provide a fluid-tight seal therebetween while permitting longitudinal movement of said second member relatively to said rear body and said conduit.

6. A blowtorch comprising an elongated tubular member; a rear body secured to said tubular member; a front body secured to said tubular member; said front body having passages therein for a fluid fuel, a combustion-supporting gas, the inlet of cooling water, and the outlet of cooling water; said elongated tubular member having lateral ports adjacent to said front body for the discharge of fluid; a cap secured over the front of said tubular member, said cap being adapted to discharge such fluid fuel and such combustion-supporting gas separately therefrom, and said cap having a portion thereof extending rearwardly beyond said lateral ports and spaced from the external surface of said tubular member for deflecting toward the rear of said blowtorch the fluid discharged through said ports; conduits arranged side-by-side within said tubular member, said conduits being secured rigidly to said front body in communication each with one of said passages, and said conduits being engaged with said rear body for longitudinal movement relatively thereto.

7. A blowtorch as claimed in claim 6 comprising means carried by said cap for breaking plugs and the like in a hole being pierced in minerals and the like.

8. In a blowtorch, an elongated tubular member having front and rear ends; an adaptor engaged with said tubular member adjacent to the front of the latter; an annular raised boss on the front of said adaptor, said boss having a sharply defined apex for engaging a cooperating member to provide a seal, and said boss providing a centrally-arranged cavity in the front of said adaptor; a hollow cap removably disposed over said adaptor, said cap having a surface on the inside thereof engaging the apex of said boss, bridging said cavity, and providing an annular chamber surrounding said boss, said cap having a central passage, and passages surrounding said central passage, all of said passages communicating with said cavity and having openings in the front surface of said cap; a nipple associated with said adaptor and disposed within the central passage of said cap in fluid-tight engagement with the wall of said central passage; supply conduits for a fluid fuel and a combustion-supporting gas associated with said adaptor and extending rearwardly therefrom within said tubular member; means providing passages in said adaptor establishing communication between one of said conduits and said nipple, and between the other of said conduits and said cavity; conduits for the inlet and outlet of a cooling fluid extending rearwardly from said adaptor; and passages in said adaptor establishing communication between said last-named conduits and said annular chamber.

9. In a blowtorch as claimed in claim 8, means providing laterally extending passage means through the wall of said elongated tubular member in back of said adaptor for discharging debris-ejection fluid.

10. A blowtorch comprising an elongated tubular member having an abutment adjacent to the front thereof; a rear body secured to said tubular member; a front body abutting against said abutment, said front body having fluid passages therein; said tubular member having lateral ports adjacent to said front body for the discharge of fluid; a cap threaded over the front of said tubular member and urging said front body against said abutment, said cap having a portion thereof extending rearwardly beyond said lateral ports and spaced from the external surface of said tubular member for deflecting toward the rear of said blowtorch the fluid discharged through said ports; conduits arranged side-by-side within said tubular member, said conduits being secured rigidly to said front body in communication each with one of said fluid passages, said conduits being removably engaged with said rear body for longitudinal movement relatively thereto.

11. A blowtorch of the type used for thermally piercing holes in minerals and like materials comprising an elongated tubular member having front and rear ends, said tubular member being adapted to provide a flame at said front end; trunnions extending laterally from said tubular member adjacent to the rear end thereof, at least one of said trunnions having a passage opening to the inside of said tubular member for the introduction of fluid to the latter; and a bail mounted on said trunnions for suspending said tubular member.

12. A heating instrumentality having front and rear ends and a side wall, said instrumentality being adapted to provide heat at said front end; passage means adjacent to said front end terminating in outlet means in said side wall for discharging debris-ejection fluid in a lateral direction therefrom; and a deflector for deflecting such fluid in a rearward direction relative to said front end, said deflector comprising a skirt secured ahead of said outlet means and extending rearwardly over said outlet means in spaced relation to said side wall.

CHARLES J. BURCH.